(12) United States Patent
Mahowald (10) Patent No.: US 8,385,898 B2
(45) Date of Patent: Feb. 26, 2013

(54) AUTO MESSAGING TO CURRENTLY CONNECTED CALLER

(75) Inventor: Peter Henry Mahowald, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 969 days.

(21) Appl. No.: 12/031,346

(22) Filed: Feb. 14, 2008

(65) Prior Publication Data

US 2009/0209240 A1 Aug. 20, 2009

(51) Int. Cl.
*H04M 3/42* (2006.01)
(52) U.S. Cl. ............... 455/415; 709/204; 379/88.13
(58) Field of Classification Search .......... 455/404.1, 455/414.4, 415; 709/204, 206, 207, 231; 705/39; 379/88.13, 88.14
See application file for complete search history.

(56) References Cited

U.S. PATENT DOCUMENTS

| | | | |
|---|---|---|---|
| 5,978,835 A * | 11/1999 | Ludwig et al. | 709/204 |
| 2004/0125933 A1* | 7/2004 | Jun et al. | 379/202.01 |
| 2006/0079201 A1* | 4/2006 | Chung et al. | 455/410 |
| 2007/0180328 A1* | 8/2007 | Cornwell et al. | 714/42 |
| 2008/0126350 A1* | 5/2008 | Shoemaker et al. | 707/9 |
| 2009/0143007 A1 | 6/2009 | Terlizzi | |

* cited by examiner

*Primary Examiner* — Charles Appiah
*Assistant Examiner* — Alexander Yi
(74) *Attorney, Agent, or Firm* — Wong, Cabello, Lutsch, Rutherford & Brucculeri, LLP (57) ABSTRACT

A messaging application and a telephony application can be activated on a mobile device for sending messages to a connected party while a telephone connection is established between the mobile device and the connected party. A user can compose a message or send a file from the mobile device to the connected party based on the caller details associated with the connected party.

31 Claims, 8 Drawing Sheets

USPATENTNO US 8,385,898 B2

AUTO MESSAGING TO CURRENTLY CONNECTED CALLER

TECHNICAL FIELD

The subject matter of this patent application is generally related to mobile devices and messaging services.

BACKGROUND

Conventional mobile devices are often dedicated to performing a specific application. For example, a mobile phone provides telephony services, a personal digital assistant (PDA) provides a way to organize addresses, contacts and notes, a media player plays content, email devices provide email communication, a browser to surf the Internet, etc. Modern mobile devices can include two or more of these applications.

While a user of a mobile device is using telephony services, the user may want to send a message or a file to the other party. To send this information, the user may have to disconnect the call, and then perform a lookup of the caller's contact information prior to being able to send the message or file. This multi-step process can be tedious for the user.

SUMMARY

A messaging application and a telephony application can be concurrently activated on a mobile device for sending messages during a call. In one aspect, a user can compose a message or send a file from the mobile device to one or more other call participants based on details associated with the one or more call participants.

In some implementations, a method includes: presenting a user interface on a mobile device having telephony and messaging capability, the user interface including a user interface element which is operable for specifying an option to send information to one or more call participants during a telephone call; detecting caller details associated with the one or more call participants; receiving user input specifying the information; receiving user input selecting the option to send the information; and sending the information to the one or more call participants during a telephone call using the caller details.

In some implementations, a method includes: identifying a content item to transfer to a telephone conference participant; and transferring the content item to the telephone conference participant without interrupting the telephone conference and using information developed to conference the participants.

In some implementations, a method includes: presenting a user interface on a mobile device having telephony and messaging capability, the user interface including a user interface element which is operable for specifying an option to send information to one or more call participants during a telephone call; detecting caller details associated with the one or more call participants; receiving user input selecting the option to send information; and sending the information to the one or more call participants during a telephone call using the caller details.

Other implementations are disclosed which are directed to systems, methods and computer-readable mediums.

DETAILED DESCRIPTION

Example Process for Sending SMS Messages while on a Call

Figure 1:
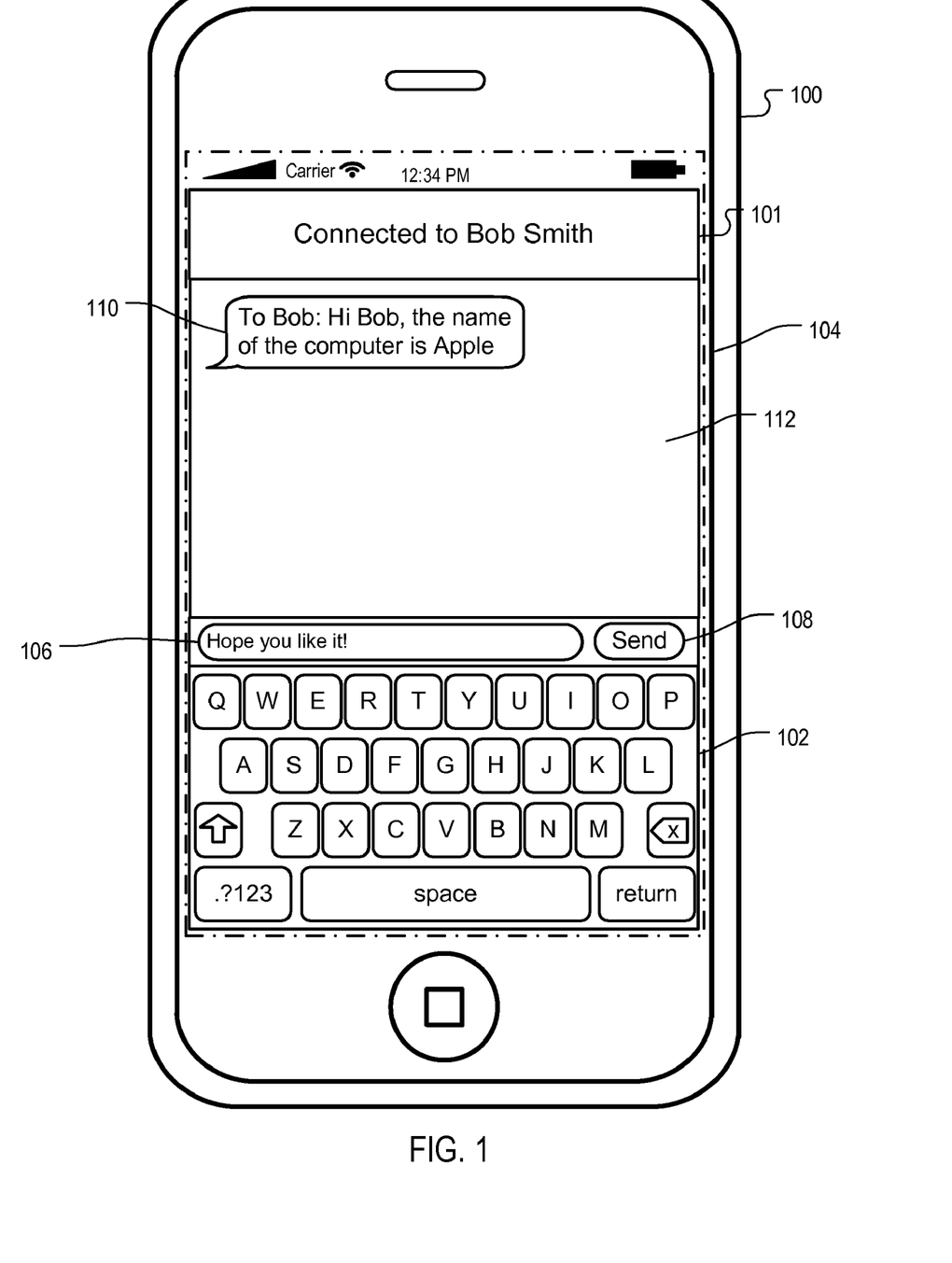
FIG. 1 illustrates an example mobile device operable for sending SMS messages to a connected caller.

FIG. 1 shows an example portable device 100. For example, the portable device 100 can be a cellular phone, a personal digital assistant (PDA), or a portable media device (e.g., a portable MPEG-1 Audio Layer 3 (MP3) player, a portable DVD player, etc.). Some examples of the portable device 100 may be an iPhone™ or an iPod Touch™ manufactured by Apple Inc. (Cupertino, Calif.). Various software applications can be executed by the portable device 100, as will be described below with reference to FIG. 6. In the depicted example, the portable device 100 is executing a telephone application and an SMS messaging application concurrently.

The mobile device 100 can include functionality for receiving telephone calls and to indicate the currently connected caller on the mobile device 100. In one implementation, when the user receives or initiates a telephone call a caller indicator 101 displays the name of the other party. In the example of FIG. 1, the mobile device 100 is currently connected to a device operated by "Bob Smith."

In one implementation, the mobile device 100 can enable a user to send one or more messages, files or other information to one or more other call participants. The message can, for example, include an SMS message or an email message. The user can send the message to the one or more call participants without disconnecting from the call prior to sending the message.

In one implementation, the mobile device 100 can receive a telephone call from a telephone number that is stored in an address book stored on the mobile device 100. The mobile device 100 can perform an automatic lookup of the contact information of the calling party in the address book 650 and use the contact details to send a message to the calling party. For example, if the user wants to send an SMS message, the mobile device 100 can send the SMS message to one or more telephone numbers of the calling party listed in the contact details. The contact details can include the name, telephone number, email address as well as other information associated with the calling party.

In the example of FIG. 1, the user is connected to the calling party "Bob Smith" 101. The user may decide to send a message to the calling party by tapping an SMS object 630 (cf. FIG. 6) while connected to the calling party. Upon pressing the SMS object 630 on the user interface, a virtual keyboard 102 appears as well as a template for the message.

The mobile device 100 can include a virtual keyboard 102 which can be used to compose the SMS message. The virtual keyboard 102 can include keys corresponding to characters and symbols. The virtual keyboard 102 can be part of a touch-sensitive touch screen 104, as will be described further below. In one example, the user can select a character by touching a key corresponding to the character on the touch screen 104.

In one implementation, the touch screen 104 can include a text input field 106 for composing an SMS message. As the user taps the desired keys on the virtual keyboard 102 the characters or symbols of the message appear in a text input field 106. After composing the message, the user touches a user interface element (e.g., a send button 108) to send the message to one or more call participants.

In one implementation, a template for the message, e.g., SMS message is automatically populated with the telephone number of a call participant upon the user tapping on the SMS object 630.

In the example of FIG. 1, the user has sent the SMS message 110, "Hi Bob, the name of the computer is Apple" to call participant "Bob Smith.". The SMS message 110 is shown in a "bubble" in a message "chat" area 112 of the touch screen 104. The mobile device 100 can send the SMS message 110 (e.g., automatically) to Bob while the call is connected.

Example Process for Sending Email Messages while on a Call

Figure 2:
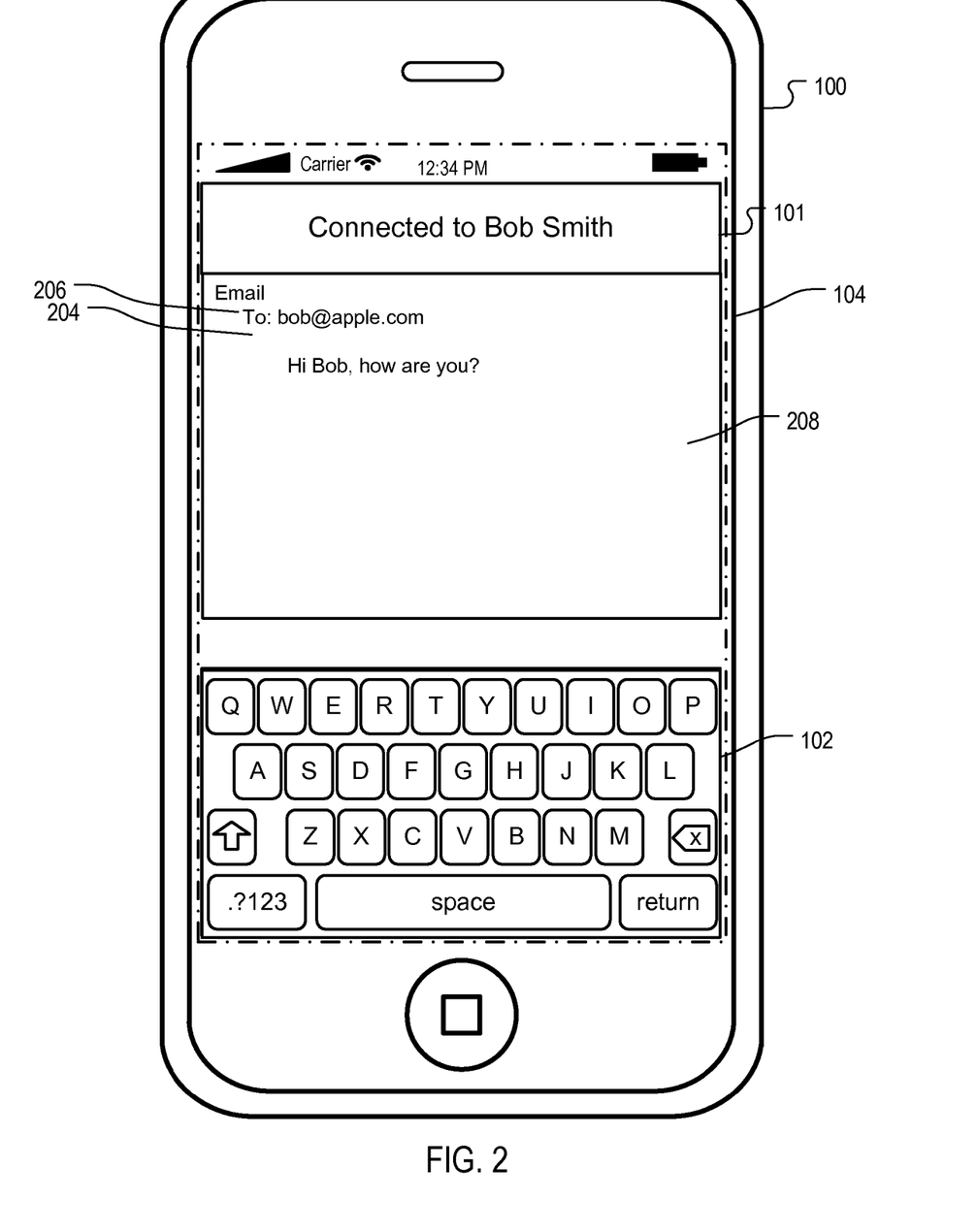
FIG. 2 illustrates another example mobile device operable for sending email messages to a connected caller.

FIG. 2 shows an example mobile device 100. In one implementation, the user of the mobile device 100 can also send an email message to a call participant without disconnecting the call. In the example of FIG. 2, the user is connected to a calling party "Bob Smith" 101, as previously described in reference to FIG. 1. In this example, however, the user has tapped the email object 612 (cf. FIG. 6) to compose and send an email message.

Figure 6:
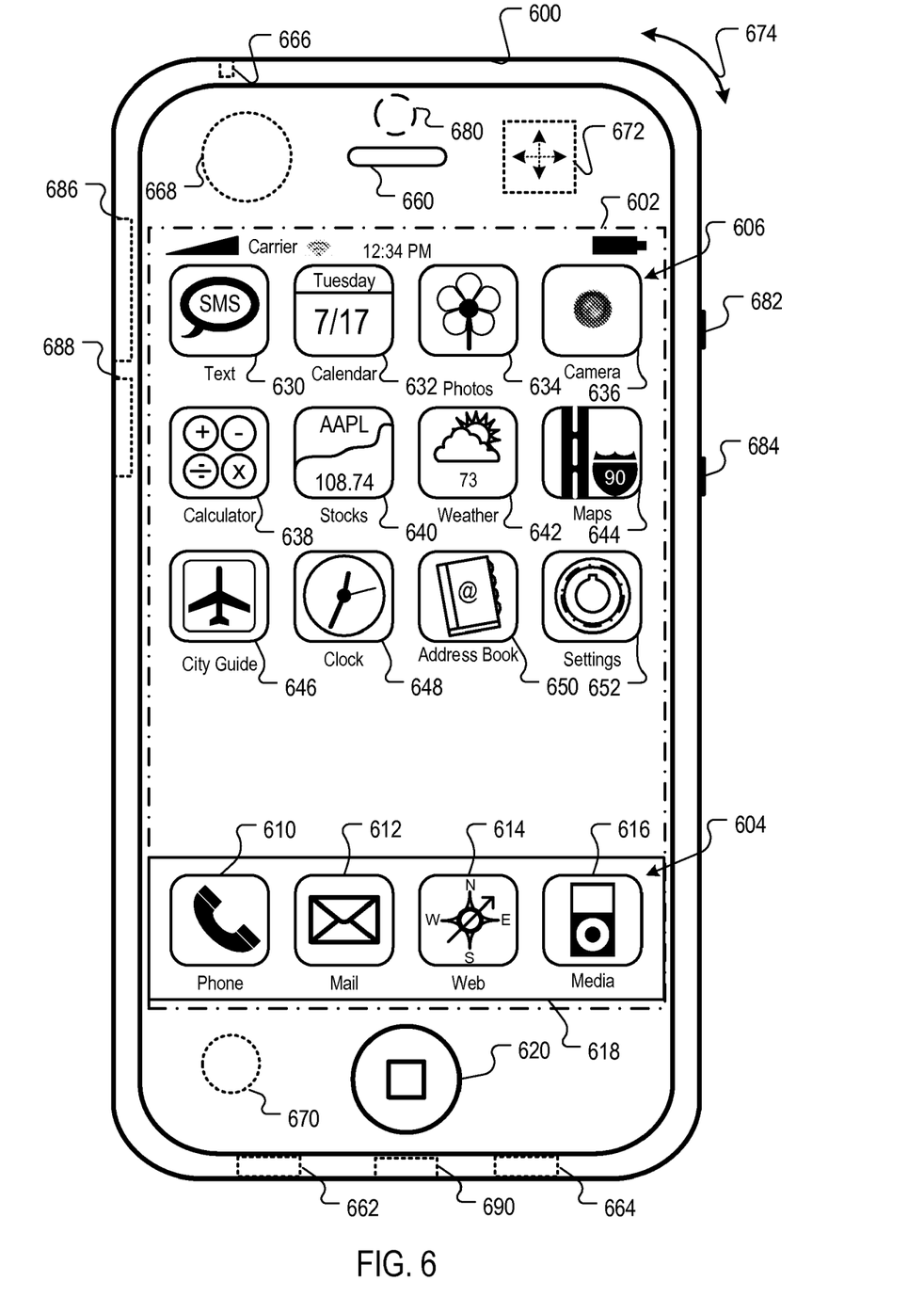
FIG. 6 illustrates an example mobile device.

In one implementation, an email template is automatically generated with the connected party's email address upon the user selecting the email object 612 while connected to the connected party on the telephone. In the example of FIG. 2, the user is connected to "Bob Smith" 101 and at the same time, is composing an email message 204 stating "Hi Bob, how are you?" to Bob Smith 101. The connected party's email address 206 is automatically populated into the template of the email message upon selection of the email object 612. The email message 204 is shown in the message "email" area 208 of the touch screen 104. The user can use the virtual keyboard 102 to compose the email message in the area 208.

Example Process for Sending Files while on a Call

Figure 3:
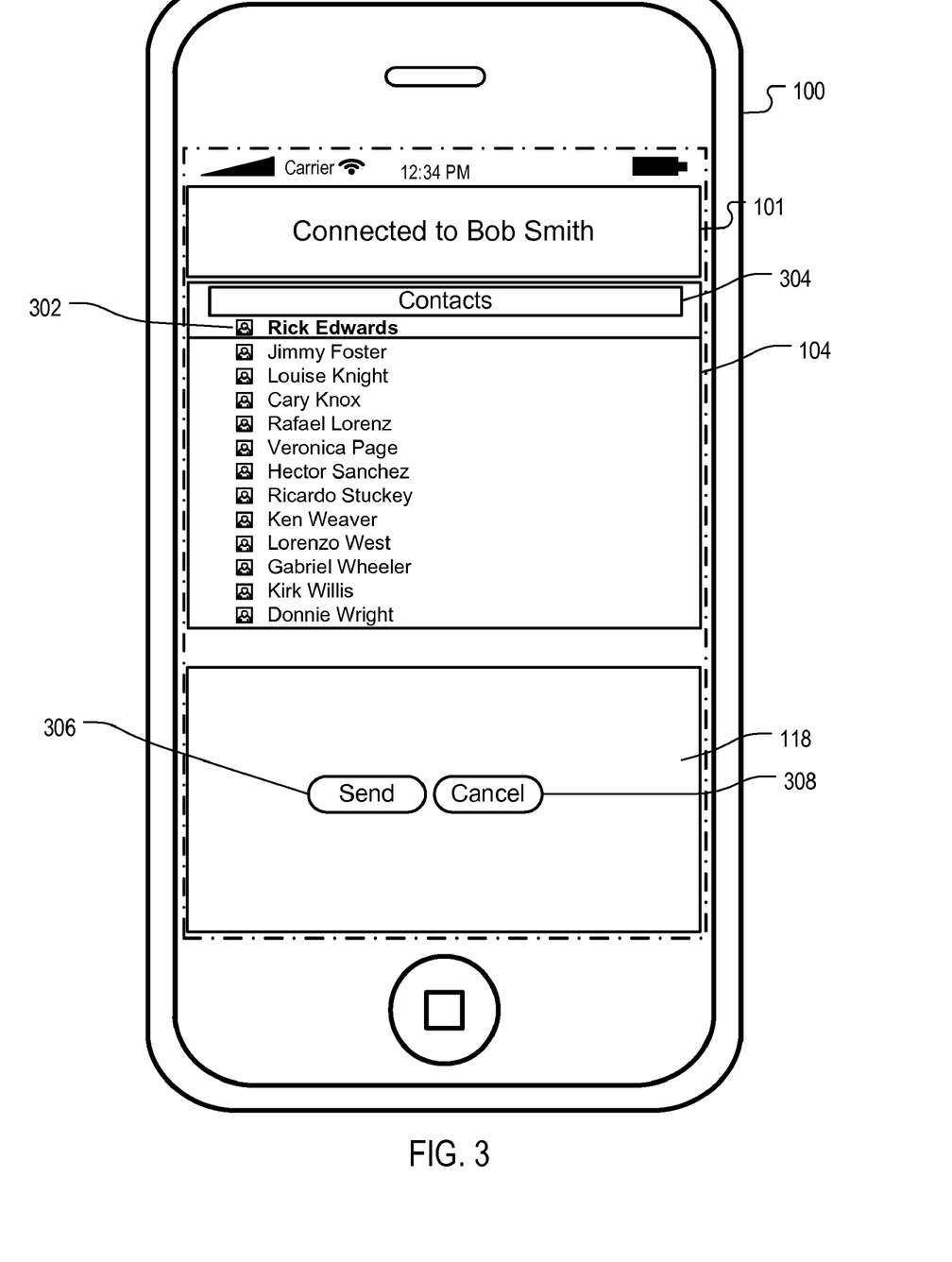
FIG. 3 illustrates another example mobile device operable for sending contact information of another user to a connected caller.

FIG. 3 illustrates an example of a mobile device operable for sending a file to a connected party. In one implementation, when a user is connected to a calling party, the user can send a file stored on the mobile device 100 to the connected party. The file can, for example, include a music file, document, note, or any other type of file stored on the mobile device 100. The file can also include the contact details of a contact stored in the address book 650 on the mobile device 100. The user can, for example, tap the address book object 650 or any other display object (e.g., display object 634 for a digital photo application, display object 616 for a music application) to access the files while connected to the calling party 101.

In the example of FIG. 3, the user has selected a contact "Rick Edwards" 302 from a list of contacts 304 to send to the connected caller "Bob Smith" 101. The user can tap the touch screen 104 on the address book display object 650 while connected to the connected party and the list of contacts 302 will appear. The user can tap on a contact in the list 302 and the tapped contact can be highlighted to visually indicate its selection. The user can then tap on a "send" button 306 to send the contact details of "Rick Edwards" to the calling party 101. The selected contact is then transmitted to the calling party 101. In one implementation, the mobile device 100 can also allow the user to cancel the file transmission by pressing a "Cancel" button 308.

In one implementation, the selected file can be transmitted to the connected party using an SMS message. The user can also include text with the SMS message along with the selected file. In another implementation, the selected file is transmitted to the connected party via an email message while the user is connected to the connected party.

In some implementations, the user can send a selected file to the calling party 101 with the touch of a single button while connected to the calling party 101. For example, the user can tap the touch screen 104 on the address book display object 650 while connected to the connected party and the list of contacts 302 will appear, where the first contact can be highlighted. The user can then tap on a "send" button 306 to send the contact details of the first contact to the calling party 101.

Figure 4:
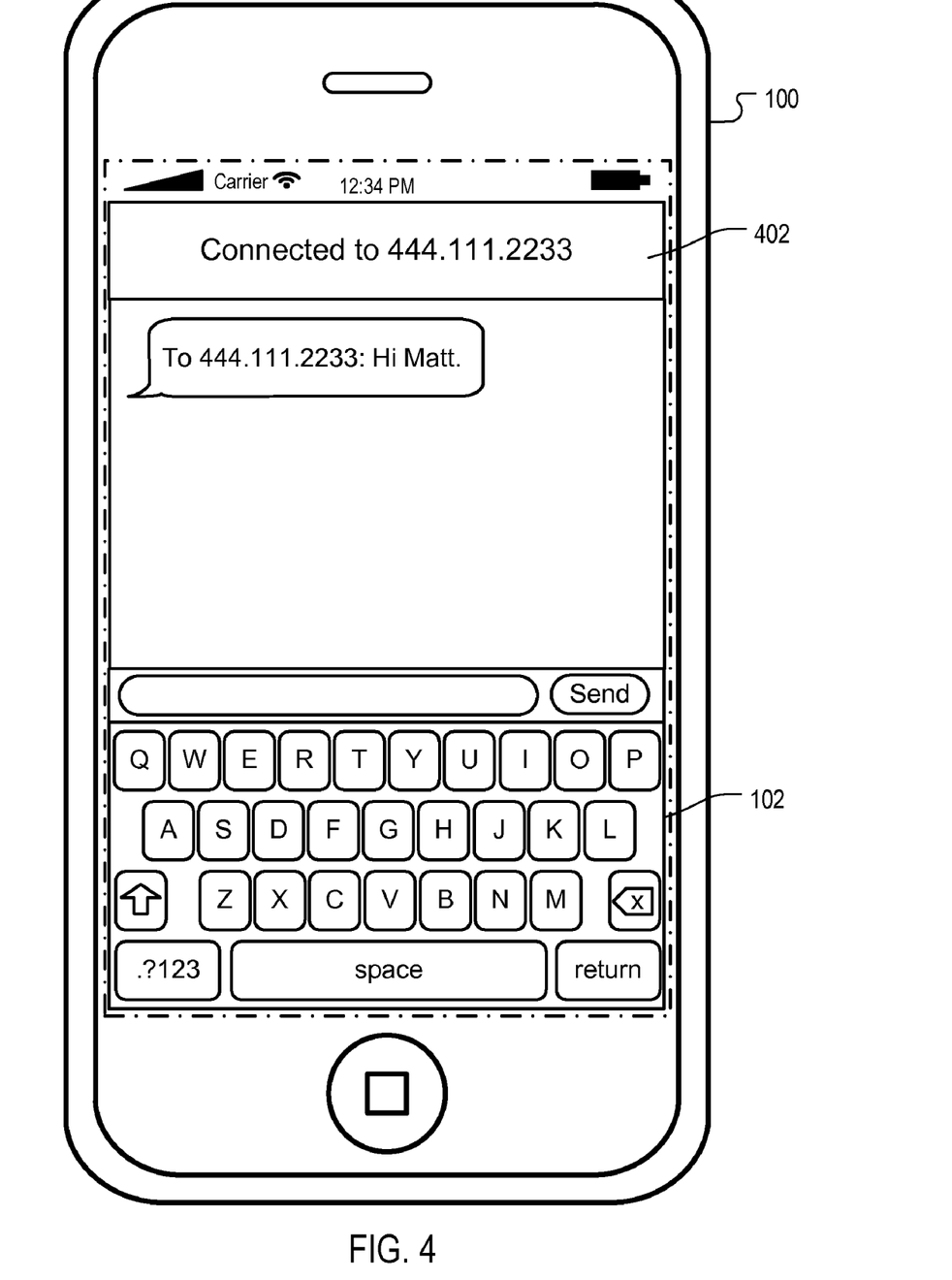
FIG. 4 illustrates an example mobile device for sending an SMS message to a connected caller.

FIG. 4 is a block diagram of an example of a mobile device operable for sending a message to a connected party. In one implementation, when a user is connected to a caller 402 that is not listed in the address book 650 of the mobile device 100, the user can send a message or a file to the connected party in the same manner as if the connected party was listed in the address book 650. The mobile device 100 can extract the recipient information from the connected call, for example the telephone number, and insert it into a template, for example, SMS template.

In the example of FIG. 4, the user is connected to the caller at phone number "444.111.2233" 402. The caller is not listed in the address book 650 of the mobile device 100; therefore, a name is not associated with the telephone number. The user has selected the SMS object 630 while connected to the user 402. The mobile device 100 can generate the SMS template and insert the telephone number of the connected party by extracting it from the currently calling party 402. The user can use the virtual keyboard 102 to create the SMS message as described above. In the example of FIG. 4, the user is sending the SMS message "Hi Matt" to the caller at "444.111.2233" while connected to the caller.

In one implementation, if the user is connected to more than one party, the user can send an SMS message, email, or a file to each of the parties on the call. In one implementation, the user can select which of the parties on the call to send the message or file to. For example, if the user is connected to two other users, the user can select to only send the message or file to one of the two users. The mobile device 100 can generate the template of the message in the same manner as described above.

Example Process for Sending Messages or Files During a Call

Figure 5:
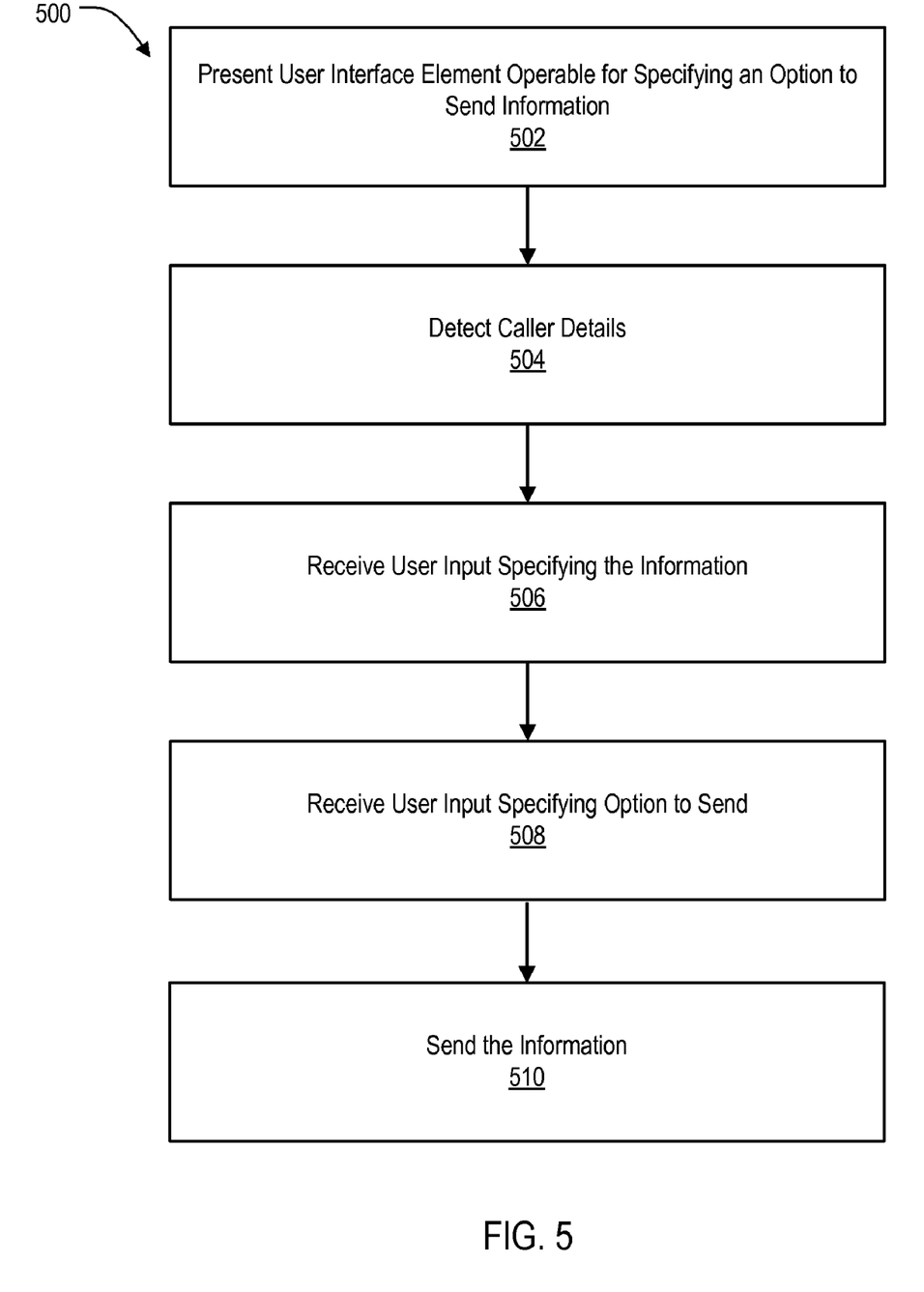
FIG. 5 is a flow diagram of an example process for sending a message to a currently connected caller.

FIG. 5 is a flow diagram of a process 500 for sending messages and/or files to a connected party. The process 500 begins presenting a user interface on the mobile device, having telephony and messaging capability, the user interface including a user interface element which is operable for specifying an option to send information to one or more call participants during a telephone call (502). The information can include an email message, an SMS message, files or any other information. Caller details associated the one or more call participants is detected (504). For example, the caller details can include the telephone number or the email address associated with the caller. User input specifying the information is received (506). User input is then received selecting the option to send the information (508). The information is then sent to other call participants during a telephone call using the caller details (510). For example, if the message is an SMS message, the telephone number can be extracted and the message can be sent as an SMS message. The message can be sent to the calling party while the mobile device 100 is connected to the calling party or called party.

In some implementations, if a file is sent to the connected party, the receiving device may ask if the contact should be saved in the address book of the mobile device 100 of the connected party. If for example, the file is a URL of a website, the receiving device may ask if the URL should be opened with a browser application on the mobile device 100 of the connected party. The mobile device 100 may also be put in speaker phone mode and the sender of the URL could walk the connected party that the URL was sent to through the information on the web page ("presentation mode"). In another implementation, if the URL link is for a product to purchase (e.g., an iTunes song, ring tone, or Apple product), a single button at the receiving mobile device 100 could purchase the item, or begin the purchase process if billing information is not already available.

In another implementation, the mobile device 100 may automatically send to the connected party, whether it's a calling party or a called party, the contact information of the user of the mobile device 100, when the mobile device 100 and the connected party are connected. For example, the email address, telephone number, home address, etc. can automatically be sent to the connected party as soon as a connected is established between the mobile device 100 and the connected party.

In some implementations, the connected party may send the calling party's location, and the mobile device 100 may opt to find directions on a map application to the connected party's location (based on the receiver's location).

Mobile Device Overview

FIG. 6 is a block diagram of an example mobile device. In some implementations, the mobile device 600 includes a touch-sensitive display 602. The touch-sensitive display 602 can implement liquid crystal display (LCD) technology, light emitting polymer display (LPD) technology, or some other display technology. The touch-sensitive display 602 can be sensitive to haptic and/or tactile contact with a user.

In some implementations, the touch-sensitive display 602 can comprise a multi-touch-sensitive display 602. A multi-touch-sensitive display 602 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,670,557, 6,677,932, and U.S. Patent Publication 2002/0016024A1, each of which is incorporated by reference herein in its entirety.

In some implementations, the mobile device 600 can display one or more graphical user interfaces on the touch-sensitive display 602 for providing the user access to various system objects and for conveying information to the user. In some implementations, the graphical user interface can include one or more display objects 604, 606. In the example shown, the display objects 604, 606, are graphic representations of system objects. Some examples of system objects include device functions, applications, windows, files, alerts, events, or other identifiable system objects.

Example Mobile Device Functionality

In some implementations, the mobile device 600 can implement multiple device functionalities, such as a telephony device, as indicated by a phone object 610; an e-mail device, as indicated by the e-mail object 612; a network data communication device, as indicated by the Web object 614; a Wi-Fi base station device (not shown); and a media processing device, as indicated by the media player object 616. In some implementations, particular display objects 604, e.g., the phone object 610, the e-mail object 612, the Web object 614, and the media player object 616, can be displayed in a menu bar 618. In some implementations, device functionalities can be accessed from a top-level graphical user interface, such as the graphical user interface illustrated in FIG. 6. Touching one of the objects 610, 612, 614 or 616 can, for example, invoke corresponding functionality.

In some implementations, the mobile device 600 can implement network distribution functionality. For example, the functionality can enable the user to take the mobile device 600 and its associated network while traveling. In particular, the mobile device 600 can extend Internet access (e.g., Wi-Fi) to other wireless devices in the vicinity. For example, mobile device 600 can be configured as a base station for one or more devices. As such, mobile device 600 can grant or deny network access to other wireless devices.

In some implementations, upon invocation of device functionality, the graphical user interface of the mobile device 600 changes, or is augmented or replaced with another user interface or user interface elements, to facilitate user access to particular functions associated with the corresponding device functionality. For example, in response to a user touching the phone object 610, the graphical user interface of the touch-sensitive display 602 may present display objects related to various phone functions; likewise, touching of the email object 612 may cause the graphical user interface to present display objects related to various e-mail functions; touching the Web object 614 may cause the graphical user interface to present display objects related to various Web-surfing functions; and touching the media player object 616 may cause the graphical user interface to present display objects related to various media processing functions.

In some implementations, the top-level graphical user interface environment or state of FIG. 6 can be restored by pressing a button 620 located near the bottom of the mobile device 600. In some implementations, each corresponding device functionality may have corresponding "home" display objects displayed on the touch-sensitive display 602, and the graphical user interface environment of FIG. 6 can be restored by pressing the "home" display object.

In some implementations, the top-level graphical user interface can include additional display objects 606, such as a short messaging service (SMS) object 630, a calendar object 632, a photos object 634, a camera object 636, a calculator object 638, a stocks object 640, a weather object 642, a maps object 644, a city guide object 646, a clock object 648, an address book object 650, a settings object 652, and a user created icon 654. Touching the user created icon 654 can, for example, invoke an Internet environment and supporting functionality and display the webpage associated with the icon 654; likewise, each selection of a display object 630, 632, 634, 636, 638, 640, 642, 644, 646, 648, 650, and 652 can invoke a corresponding object environment and functionality.

Additional and/or different display objects can also be displayed in the graphical user interface of FIG. 6. For example, if the device 600 is functioning as a base station for other devices, one or more "connection" objects may appear in the graphical user interface to indicate the connection. In some implementations, the display objects 606 can be configured by a user, e.g., a user may specify which display objects 606 are displayed, and/or may download additional applications or other software that provides other functionalities and corresponding display objects.

In some implementations, the mobile device 600 can include one or more input/output (I/O) devices and/or sensor devices. For example, a speaker 660 and a microphone 662 can be included to facilitate voice-enabled functionalities, such as phone and voice mail functions. In some implementations, a loud speaker 664 can be included to facilitate hands-free voice functionalities, such as speaker phone functions. An audio jack 666 can also be included for use of headphones and/or a microphone.

In some implementations, a proximity sensor 668 can be included to facilitate the detection of the user positioning the mobile device 600 proximate to the user's ear and, in response, to disengage the touch-sensitive display 602 to prevent accidental function invocations. In some implementations, the touch-sensitive display 602 can be turned off to conserve additional power when the mobile device 600 is proximate to the user's ear.

Other sensors can also be used. For example, in some implementations, an ambient light sensor 670 can be utilized to facilitate adjusting the brightness of the touch-sensitive display 602. In some implementations, an accelerometer 672 can be utilized to detect movement of the mobile device 600, as indicated by the directional arrow 674. Accordingly, display objects and/or media can be presented according to a detected orientation, e.g., portrait or landscape. In some implementations, the mobile device 600 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 600 or provided as a separate device that can be coupled to the mobile device 100 through an interface (e.g., port device 690) to provide access to location-based services.

The mobile device 600 can also include a camera lens and sensor 680. In some implementations, the camera lens and sensor 680 can be located on the back surface of the mobile device 600. The camera can capture still images and/or video.

The mobile device 600 can also include one or more wireless communication subsystems, such as an 802.11b/g communication device 586, and/or a Bluetooth™ communication device 688. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 690, e.g., a Universal Serial Bus (USB) port, or a docking port, or some other wired port connection, can be included. The port device 690 can, for example, be utilized to establish a wired connection to other computing devices, such as other communication devices 600, network access devices, a personal computer, a printer, or other processing devices capable of receiving and/or transmitting data. In some implementations, the port device 690 allows the mobile device 600 to synchronize with a host device using one or more protocols, such as, for example, the TCP/IP, HTTP, UDP and any other known protocol.

Network Operating Environment

Figure 7:
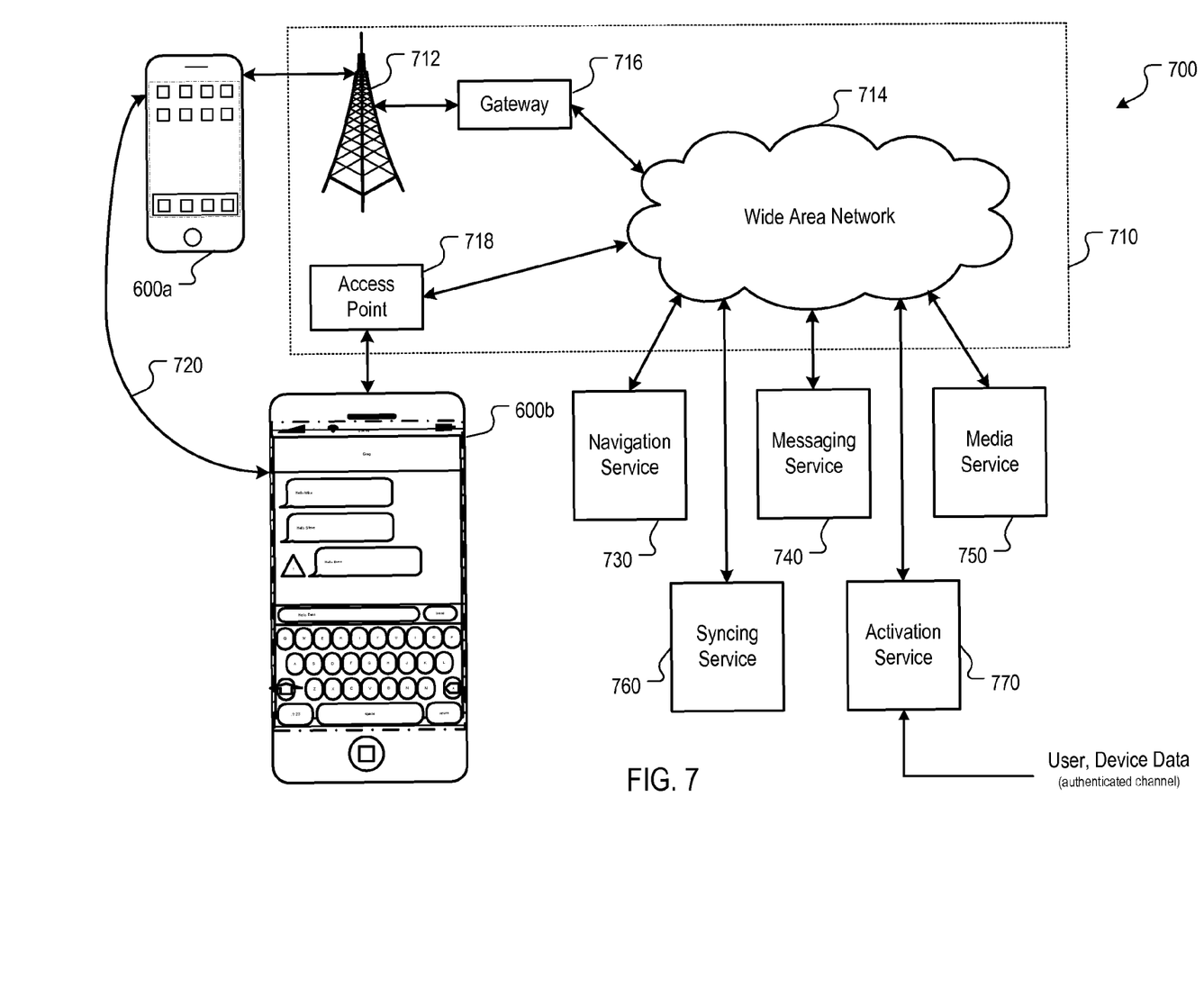
FIG. 7 is a block diagram of an example network operating environment for the mobile device of FIG. 6.

FIG. 7 is a block diagram of an example network operating environment 700 for the mobile device 600 of FIG. 6. The mobile device 600 of FIG. 6 can, for example, communicate over one or more wired and/or wireless networks 710 in data communication. For example, a wireless network 712, e.g., a cellular network, can communicate with a wide area network (WAN) 714, such as the Internet, by use of a gateway 716. Likewise, an access point 718, such as an 802.11g wireless access point, can provide communication access to the wide area network 714. In some implementations, both voice and data communications can be established over the wireless network 712 and the access point 718. For example, the mobile device 600a can place and receive phone calls (e.g., using VoIP protocols), send and receive e-mail messages (e.g., using POP3 protocol), and retrieve electronic documents and/or streams, such as web pages, photographs, and videos, over the wireless network 712, gateway 716, and wide area network 714 (e.g., using TCP/IP or UDP protocols). Likewise, the mobile device 600b can place and receive phone calls, send and receive e-mail messages, and retrieve electronic documents over the access point 718 and the wide area network 714. In some implementations, the mobile device 600 can be physically connected to the access point 718 using one or more cables and the access point 718 can be a personal computer. In this configuration, the mobile device 600 can be referred to as a "tethered" device.

The mobile devices 600a and 600b can also establish communications by other means. For example, the wireless device 600a can communicate with other wireless devices, e.g., other wireless devices 100, cell phones, etc., over the wireless network 712. Likewise, the mobile devices 600a and 600b can establish peer-to-peer communications 720, e.g., a personal area network, by use of one or more communication subsystems, such as the Bluetooth™ communication device 588 shown in FIG. 6. Other communication protocols and topologies can also be implemented.

The mobile device 100 can, for example, communicate with one or more services 730, 740, 750, 760, and 770 over the one or more wired and/or wireless networks 710. For example, a navigation service 730 can provide navigation information, e.g., map information, location information, route information, and other information, to the mobile device 100.

A messaging service 740 can, for example, provide e-mail and/or other messaging services. A media service 750 can, for example, provide access to media files, such as song files, movie files, video clips, and other media data. A syncing service 760 can, for example, perform syncing services (e.g., sync files). An activation service 770 can, for example, perform an activation process 600 for activating the mobile device 600, as described in reference to FIG. 6. Other services can also be provided, including a software update service that automatically determines whether software updates exist for software on the mobile device 600, then downloads the software updates to the mobile device 600 where it can be manually or automatically unpacked and/or installed.

The mobile device 600 can also access other data and content over the one or more wired and/or wireless networks 710. For example, content publishers 770, such as news sites, RSS feeds, web sites, blogs, social networking sites, developer networks, etc., can be accessed by the mobile device 600. Such access can be provided by invocation of a web browsing function or application (e.g., a browser) in response to a user touching the Web object 614.

Example Mobile Device Architecture

Figure 8:
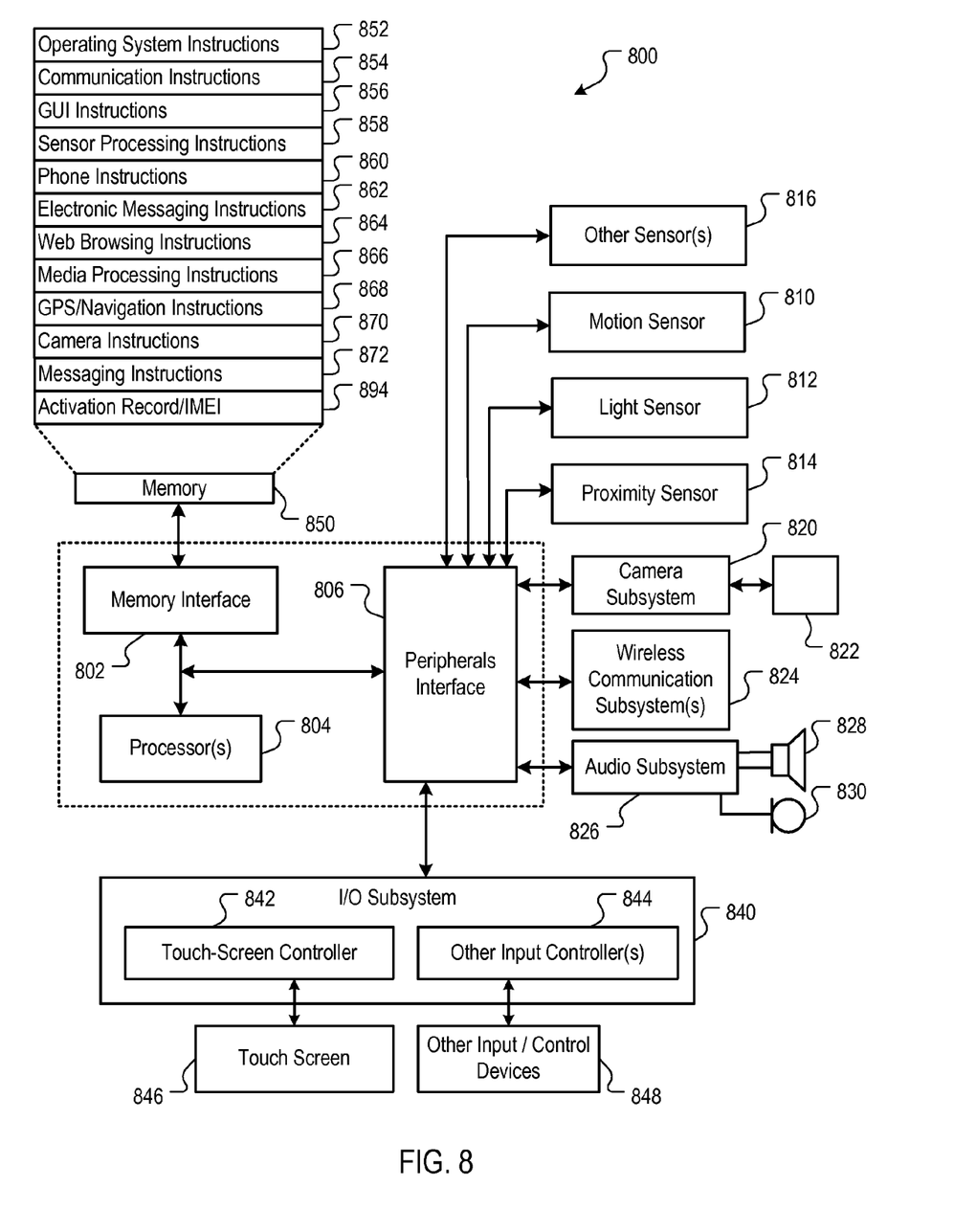
FIG. 8 is a block diagram of an example implementation of the mobile device of FIG. 6.

FIG. 8 is a block diagram 800 of an example implementation of the mobile device 600 of FIG. 6. The mobile device 600 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the mobile device 600 can be coupled by one or more communication buses or signal lines.

Sensors, devices and subsystems can be coupled to the peripherals interface 806 to facilitate multiple functionalities. For example, a motion sensor 810, a light sensor 812, and a proximity sensor 814 can be coupled to the peripherals interface 806 to facilitate the orientation, lighting and proximity functions described with respect to FIG. 6. Other sensors 816 can also be connected to the peripherals interface 806, such as a positioning system (e.g., GPS receiver), a temperature sensor, a biometric sensor, or other sensing device, to facilitate related functionalities.

A camera subsystem 820 and an optical sensor 822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the mobile device 600 is intended to operate. For example, a mobile device 600 may include communication subsystems 824 designed to operate over a GSM network, a GPRS network, an EDGE network, a Wi-Fi or WiMax network, and a Bluetooth™ network. In particular, the wireless communication subsystems 824 may include hosting protocols such that the device 600 may be configured as a base station for other wireless devices.

An audio subsystem 826 can be coupled to a speaker 828 and a microphone 830 to facilitate voice-enabled functions, such as voice recognition, voice replication, digital recording, and telephony functions.

The I/O subsystem 840 can include a touch screen controller 842 and/or other input controller(s) 844. The touch-screen controller 842 can be coupled to a touch screen 846. The touch screen 846 and touch screen controller 842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 846.

The other input controller(s) 844 can be coupled to other input/control devices 848, such as one or more buttons, rocker switches, thumb-wheel, infrared port, USB port, and/or a pointer device such as a stylus. The one or more buttons (not shown) can include an up/down button for volume control of the speaker 828 and/or the microphone 830.

In one implementation, a pressing of the button for a first duration may disengage a lock of the touch screen 846; and a pressing of the button for a second duration that is longer than the first duration may turn power to the mobile device 600 on or off. The user may be able to customize a functionality of one or more of the buttons. The touch screen 846 can, for example, also be used to implement virtual or soft buttons and/or a keypad or keyboard.

In some implementations, the mobile device 600 can present recorded audio and/or video files, such as MP3, AAC, and MPEG files. In some implementations, the mobile device 600 can include the functionality of an MP3 player, such as an iPod™. The mobile device 600 may, therefore, include a 36-pin connector that is compatible with the iPod. Other input/output and control devices can also be used.

The memory interface 802 can be coupled to memory 850. The memory 850 can include high-speed random access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks. The operating system 852 may include instructions for handling basic system services and for performing hardware dependent tasks.

The memory 850 may also store communication instructions 854 to facilitate communicating with one or more additional devices, one or more computers and/or one or more servers. The memory 850 may include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GPS/Navigation instructions 868 to facilitate GPS and navigation-related processes and instructions; camera instructions 870 to facilitate camera-related processes and functions; and/or other messaging instructions 872 to facilitate processes and functions, as described in reference to FIGS. 1-5.

Each of the above identified instructions and applications can correspond to a set of instructions for performing one or more functions described above. These instructions need not be implemented as separate software programs, procedures or modules. The memory 850 can include additional instructions or fewer instructions. Furthermore, various functions of the mobile device 600 may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method, comprising: presenting a user interface on a first mobile device, the user interface including a display object graphically representing a messaging application that is configured for sending messaging information; establishing a telephone call with a call participant who is using a second mobile device; detecting, on the first mobile device, caller details associated with the call participant based on establishing the telephone call, the caller details including one or more of a telephone number and an email address corresponding to the call participant; receiving a first user input through the user interface for launching the messaging application while the telephone call is in progress; responsive to receiving the first user input, launching the messaging application, including generating a messaging template that is automatically populated with an address of the call participant based on the detected caller details; receiving a second user input through the user interface specifying messaging information to send to the call participant; and sending the messaging information comprising one of a text-based message and a multimedia message to the call participant during the telephone call using the generated messaging template; wherein the detecting comprises when the user is connected to a caller that is not listed in an address book of the user's mobile device, extracting recipient information from the connected call to insert into the generated messaging template.

2. The method of claim 1, wherein the messaging template including the messaging information is sent to the call participant in response to receiving a touch or input specifying to send the messaging information.

3. The method of claim 1, further comprising:
   receiving a telephone call from at least one call participant on the mobile device.

4. The method of claim 1, further comprising:
   placing a telephone call to at least one call participant on the mobile device.

5. The method of claim 1, wherein the messaging information is at least one of an SMS message, an email message, or a content file stored on the mobile device.

6. The method of claim 5, wherein the content file is at least one of a personal contact information stored on the mobile device, a text message, an audio file, an image file, and a video file.

7. The method of claim 1, wherein detecting caller details associated with the call participant comprises:
   detecting the caller details associated with the call participant from a list of contacts stored on the mobile device, wherein the call participant is included in the list of contacts.

8. The method of claim 4, wherein detecting caller details associated with the call participant comprises:
   detecting the caller details associated with the call participant from the established telephone call.

9. The method of claim 1, further comprising:
   receiving user input specifying an option to initiate sending the information to the call participant.

10. A system comprising: a processor; and a computer-readable medium coupled to the processor and having instructions stored thereon, which, when executed by the processor, cause the processor to perform operations comprising: presenting a user interface on a first mobile device, the user interface including display object graphically representing a messaging application that is configured for sending messaging information; establishing a telephone call with a call participant who is using a second mobile device; detecting, on the first mobile device, caller details associated with the call participant based on establishing the telephone call, the caller details including one or more of a telephone number and an email address corresponding to the call participant; receiving a first user input through the user interface for launching the messaging application while the telephone call is in progress; responsive to receiving the first user input, launching the messaging application, including generating a messaging template that is automatically populated with an address of the call participant based on the detected caller details; receiving a second user input through the user interface specifying messaging information to send to the call participant; and sending the messaging information comprising one of a text-based message and a multimedia message to the call participant during the telephone call using the generated messaging template; wherein the detecting comprises when the user is connected to a caller that is not listed in an address book of the user's mobile device, extracting recipient information from the connected call to insert into the generated messaging template.

11. The system of claim 10, wherein the messaging template including the messaging information is sent to the call participant in response to receiving a touch or input specifying to send the messaging information.

12. The system of claim 10, wherein the instructions cause the processor to perform operations further comprising:
   placing a telephone call to at least one call participant on the mobile device.

13. The system of claim 10, wherein the messaging information is at least one of an SMS message, an email message, or a content file stored on the mobile device.

14. The system of claim 13, wherein the content file is at least one of a personal contact information stored on the mobile device, a text message, an audio file, an image file, and a video file.

15. The system of claim 10, wherein the instructions cause the processor to perform operations further comprising:
   detecting the caller details associated with the call participant from a list of contacts stored on the mobile device, wherein the call participant is included in the list of contacts.

16. The system of claim 12, wherein the instructions cause the processor to perform operations further comprising:
   detecting the caller details associated with the call participant from the established telephone call.

17. The system of claim 10, wherein the instructions cause the processor to perform operations further comprising:
   receiving user input specifying an option to initiate sending the information to the call participant.

18. A computer program product, encoded on a non-transitory computer-readable medium, operable to cause data processing apparatus to perform operations comprising: presenting a user interface on a first mobile device, the user interface including a display object graphically representing a messaging application that is configured for sending messaging information; establishing a telephone call with a call participant who is using a second mobile device; detecting, on the first mobile device, caller details associated with the call participant based on establishing the telephone call, the caller details including one or more of a telephone number and an email address corresponding to the call participant; receiving a first user input through the user interface for launching the messaging application while the telephone call is in progress; responsive to receiving the first user input, launching the messaging application, including generating a messaging template that is automatically populated with an address of the call participant based on the detected caller details; receiving a second user input through the user interface specifying messaging information to send to the call participant; and sending the messaging information comprising one of a text-based message and a multimedia message to the call participant during the telephone call using the generated messaging; wherein the detecting comprises when the user is connected to a caller that is not listed in an address book of the user's mobile device, extracting recipient information from the connected call to insert into the generated messaging template.

19. The computer program product of claim 18, wherein the messaging template including the messaging information is sent to the call participant in response to receiving a touch or input specifying to send the messaging information.

20. The computer program product of claim 18, further operable to cause data processing apparatus to perform operations comprising:
   receiving a telephone call from at least one call participant on the mobile device.

21. The computer program product of claim 18, further operable to cause data processing apparatus to perform operations comprising:
   placing a telephone call to at least one call participant on the mobile device.

22. The computer program product of claim 18, wherein the messaging information is at least one of an SMS message, an email message, or a content file stored on the mobile device.

23. The computer program product of claim 22, wherein the content file is at least one of a personal contact information stored on the mobile device, a text message, an audio file, an image file, and a video file.

24. The computer program product of claim 18, wherein detecting caller details associated with the call participant comprises:
   detecting the caller details associated with the call participant from a list of contacts stored on the mobile device, wherein the call participant is included in the list of contacts.

25. The computer program product of claim 21, wherein detecting caller details associated with the call participant comprises:
   detecting the caller details associated with the call participant from the established telephone call.

26. The computer program product of claim 18, further operable to cause data processing apparatus to perform operations comprising:
   receiving user input specifying an option to initiate sending the information to the call participant.

27. The method of claim 1, wherein the first mobile device is configured to receive the telephone call from the call participant, and configured to perform a lookup of contact information of the call participant in an address book.

28. The method of claim 1, further comprising:
   receiving, from a third mobile device, a telephone call from a second call participant; and
   detecting caller details associated with the second call participant based on the telephone call, the caller details including one or more of a name, a telephone number, or an email address corresponding to the second call participant.

29. The method of claim 28, further comprising:
   receiving user input through the user interface specifying messaging information to send to the call participant and the second call participant, wherein the messaging information comprises a text or multimedia message; and
   sending the text or multimedia message to the call participant and the second call participant during the telephone call using the detected caller details associated with the call participant and the second call participant.

30. The method of claim 1, wherein the messaging information comprises a Uniform Resource Locator of a website and, upon receiving the Uniform Resource Locator of the website, the second device accepts user input for opening the Uniform Resource Locator of the website in a browser application.

31. The method of claim 1, wherein the messaging information comprises a Uniform Resource Locator link referencing a product and, upon receiving the Uniform Resource Locator link, the second device accepts user input for purchasing the referenced product.

* * * * *